United States Patent [19]

Grantland et al.

[11] Patent Number: 4,903,294
[45] Date of Patent: Feb. 20, 1990

[54] LOW VOLTAGE OPERATED COIN RELAY

[75] Inventors: Gary Grantland, Hartselle; Attle D. Johnson, Somerville, both of Ala.

[73] Assignee: Palco Telecom Inc., Nashville, Tenn.

[21] Appl. No.: 301,965

[22] Filed: Jan. 9, 1989

[51] Int. Cl.4 .................. H04M 1/02; H04M 17/00
[52] U.S. Cl. ............................... 379/150; 361/194
[58] Field of Search ............... 329/150, 146, 152, 153, 329/155; 361/194

[56] References Cited

U.S. PATENT DOCUMENTS 4,719,648  1/1988  Boeckmann ............... 379/150 X

Primary Examiner—Stafford D. Schreyer
Attorney, Agent, or Firm—Robert J. Black

[57] ABSTRACT

A coin relay adapted for use with an associated coin hopper mechanism particularly adapted for use in a microcomputer based deregulated paystation. The relay requires only minimum voltages to operate with the associated coin relay operate and release timing controlled by an assoicated microcomputer.

9 Claims, 2 Drawing Sheets

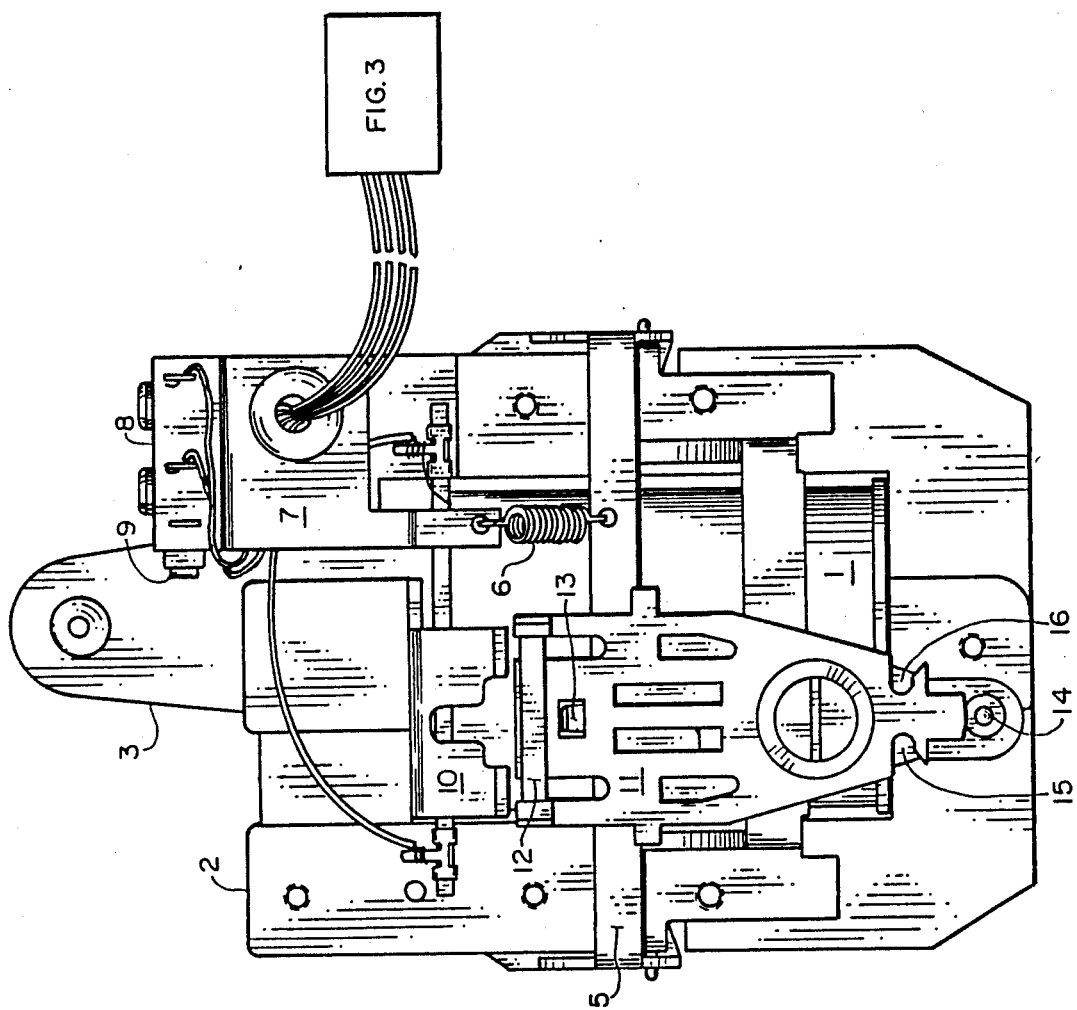
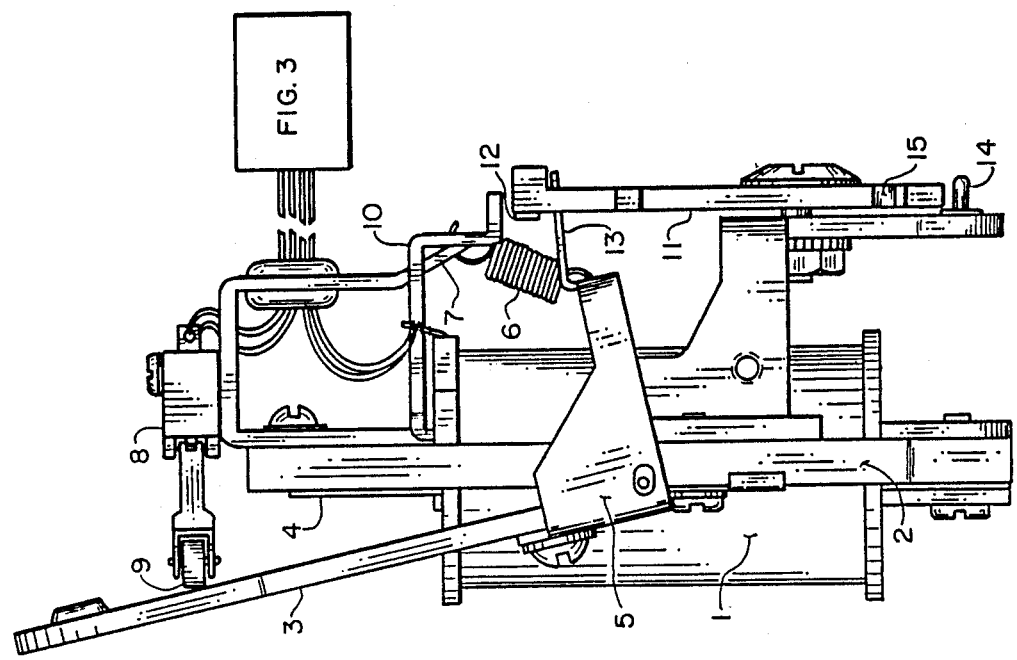

LOW VOLTAGE OPERATED COIN RELAY

BACKGROUND OF THE INVENTION

1. FIELD OF THE INVENTION

The present invention pertains to coin operated telephone paystations and more particularly to a coin relay for use with an associated coin hopper mechanism in a microcomputer controlled coin telephone as utilized in the deregulated paystation industry.

2. BACKGROUND ART

Coin relays with associated coin hopper mechanisms have been utilized in paystations for many years to hold the coind deposited by the user until telephone calls have been completed or until the telephone central office sends appropriate collect or refund signals to the paystation for disposition of the coins. These coin control relays in general are designed to operate on coin collect and refund signals as applied by the telephone central office. In the regulated paystation industry such relays are generally referred to as 48 volt relays requiring voltage in approximately the 48 volt range for operation.

The coin control relays when operated are specifically designed to be operated on a slow-to-release basis to provide adequate time for coins deposited by the user to fall from the hopper. Various operate and release times have been required to meet the standards set by different telephone operating companies. Therefore, such relays frequently require special adjustments for many telephone company customer users. Such coin control relays usually contain contacts which open the current path to the relay until coins are deposited.

With the advent of the deregulated paystation market coin relays have been modified to operate on lower voltages with various configurations of relay coils and contacts to meet some of the needs of the deregulated market. Most, if not all, of the deregulated paystation manufacturers utilize 5 volt logic power supplies with logic included in the telephone circuitry, however because of the particular requirements of the coin relays they have been required to supply additional circuitry and power supplies to power the coin relays at the higher voltages commonly used as in the regulated paystation industry.

SUMMARY OF THE INVENTION

The relay of the present invention is intended for use in coin telephones and designed for use with hopper assemblies similar to those used in telephones manufactured by General Telephone and Electronics and Palco Telecom Incorporated, with the design parameters being dictated by the intended use in the deregulated paystation market. The relay of the present invention provides the necessary flexibility and relay timing while operating at substantially lower power than previous relays intended for use in the regulated market.

When deregulation came to the telephone operating industry, it became possible in some states for users to provide their own coin telephones while leasing only the telephone lines. Obviously, these paystations do not rely on the usual telephone central office control connections and accordingly are usually controlled by some form of computer. Like those telephone paystations utilized in the regulated market, facilities must be included within the paystation to collect and refund coins deposited by telephone users. The logic circuitry usually utilized in such non-regulated market telephone paystations as noted is typically operated at low voltages, therefore it is most convenient to have the coin relay also be operable at such low voltages.

The paystation relay in accordance with the present invention noted above is intended for use with coin hoppers of conventional design. Basic elements of the relay, like most coin relays, consist of a relay coil filling the center portion of an E-shaped core and with a pivotally mounted armature attached to the outer legs of the core. A control circuit under control of a microcomputer is attached to the relay and includes a number of transistors and associated driver circuitry connected between the microcomputer and the transistors. This particular control circuit includes circuit connections to the coil and operates to conduct operating current over the connections to the coil to cause the relay armature to move in a direction toward the core in a manner generally accepted as seen in similar relays. A switch is also mounted on an associated bracket included as part of the relay and in response to closing of the armature operates contacts also connected to the microcomputer. When the contacts are closed the control circuit will then change the current to the relay coil from an operating mode to a holding mode. The same mounting bracket that supports the microswitch in proper relationship to the relay armature also provides a connecting point between a bracket attached to the armature and the bracket with a return spring which moves the armature in a direction away from the relay core when an operate holding current is no longer present. The armature support bracket also has affixed thereto a rocker arm which engages a non-magnetic selector card which interfaces with the control mechanisms for coin hopper in a manner similar to that found in prior art relays.

A center pole piece also comprises an extension of the metal from the relay core in a downward direction towards the selector card, extending a magnetic path when the relay is actuated which interfaces with a bar magnet mounted on the selector card. By virtue of the polarity of the current flowing through the relay coil, the bar magnet included on the selector card will cause the card to shift to the left or right causing the selector card by means of notches included therein to engage either the coin collect or coin refund mechanism to the coin hopper. A support bracket or framework is connected to the core and provides facilities for the coin hopper to be attached to the relay as well as providing an extension off the bracket which has a center pin included thereon which aids in the proper positioning of the selector card mechanism referred to above.

BRIEF DESCRIPTION OF THE DRAWINGS

FIG. 1 is a front view of a coin control relay in accordance with the present invention.

FIG. 2 is a right side view of a coin control relay in accordance with the present invention.

DESCRIPTION OF THE PREFERRED EMBODIMENT

Figure 3:
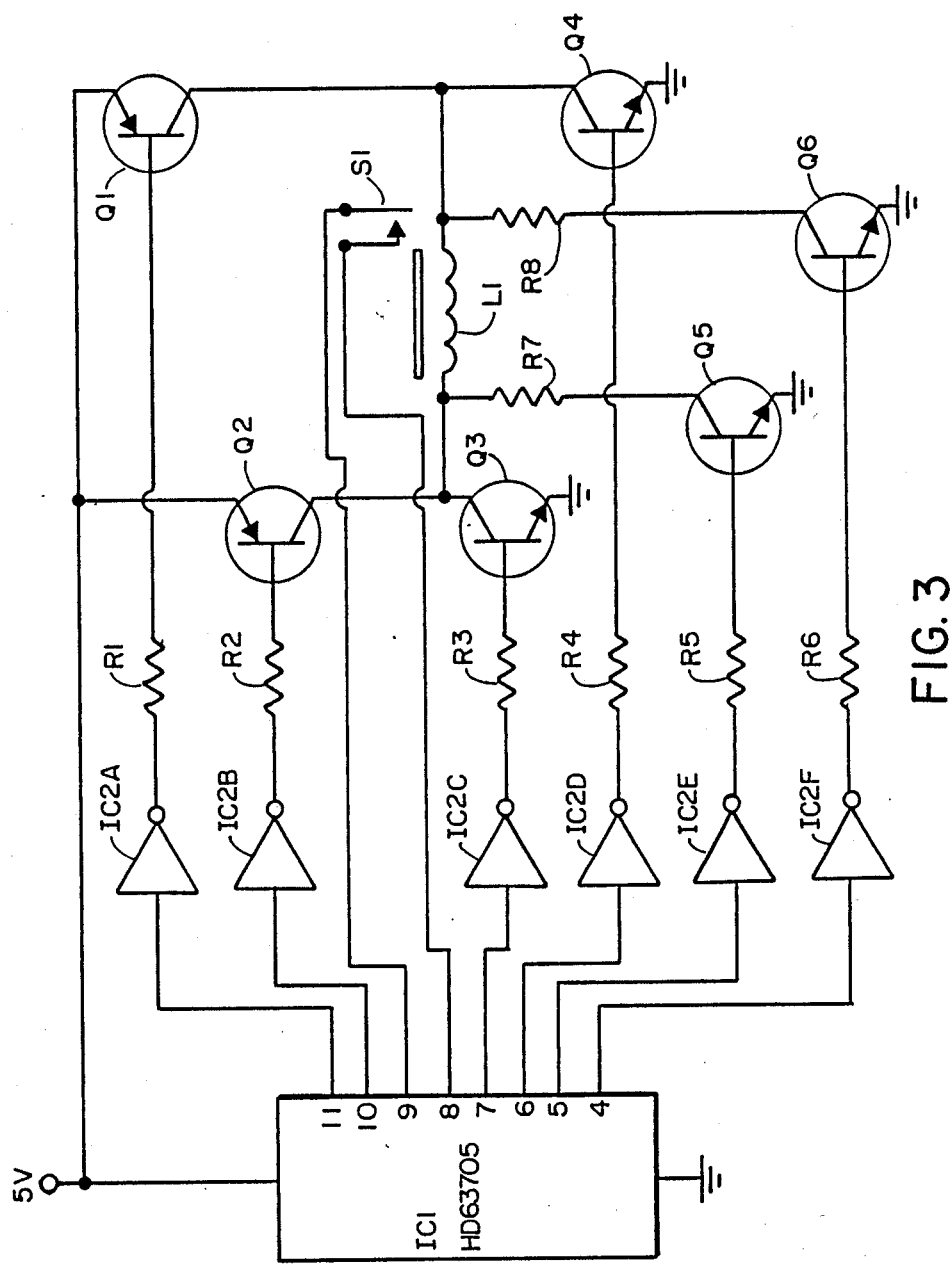
FIG. 3 is a circuit diagram of the control circuit utilized for operation of the coin control relay in accordance with the present invention.

Referring now to FIG. 1, a 5 volt coin relay in accordance with the present invention is shown. Item 1 is the relay coil assembly. When the 5 volt DC current is supplied to the coil assembly, the armature 3 closes towards the relay coil core 2. The pivotally mounted armature support bracket 5 is attached to the armature and provides the necessary pivotal mounting. The return spring 6 is attached to the armature support bracket and mounting bracket 7. A microswitch 8 is attached to mounting bracket 7 and so positioned as to permit its actuator 9 to operate switch 8 when the relay is operated. The return spring 6 is adjusted so that the relay will operate at approximately 4 volts. This adjustment is accomplished by bending mounting bracket 7. The switch actuator 9 is also adjusted to provide a closed contact from switch 8 when the relay is fully operated.

When the relay is operated, the magnetic shield 4 (non-magnetic material) prevents the armature from making physical contact with the relay core. This arrangement reduces the residual magnetism, allowing only a small amount of force from the return spring 6 to return the armature 3 to the open position. The very light return force also allows the relay to operate with a small amount of DC current to the relay coil. The small amount of residual magnetism also allows the relay to return to the open position without the long delays typically required when the armature 3 makes contact with the relay core 2.

The significant difference in the coin relay of the present invention and other relays previously used in the coin telephone industry is the use of the magnetic shield 4 (of non-magnetic material). This shield does not significantly affect the operate or pull-in current but greatly reduces the amount of force required to return the armature to the open position. Previous coin relay designs provided a shirt circuit across the coil after the relay is closed which increases the time required for the magnetic field to collapse, thereby delaying the return of the armature 3 to the open position. The thickness of the material used for the magnetic shield controls the amount of hold current required for operation of the coin relay.

Contacts of switch 8 provide an indication to the microcomputer of FIG. 3 or other controlling device when the relay is closed. Thus switch 8 can be used to indicate when the relay is stuck in closed or if necessary for timing the relay.

Referring now to FIG. 2, the right side of the relay is shown. Of particular interest is bar magnet 12 attached to selector card 11. The center pole piece 10 for the relay core 2 is positioned over the bar magnet 12. When the relay operates the rocker arm 13 forces the selector card down. The bar magnet 12 then forces the selector card to tilt to the left or right depending on the polarity of current through relay coil 1. Slots 15 and 16 in the lower section of the selector card operate the door latches of the associated coin hopper in the well known manner. Which slot engaging the door latches depends on the direction the selector card 11 is tilted by the interaction of the bar magnet 12 and the polarity of the current flowing through relay core 2. When the notch 15 is engaging the hopper mechanism, coins deposited in the associated coin relay hopper will be refunded. If the notch 16 is engaging the mechanism of the coin relay hopper, then any coins deposited in the coin relay hopper will be collected.

The circuit of FIG. 3 is a parfial schematic showing a simplified method for driving the 5 volt relay of the present invention and controlling the relay timing. The operate release time of the relay is much faster than the generally accepted time for coins deposited in the coin relay hopper once the relay is operated. The attached microcomputer, which in one embodiment of the present invention was a Hitachi HD63705-VOP, monitors the switching contacts shown as SW1 to sense when the relay is fully operated and at this time it will then supply the appropriate holding current, then releasing the holding current after the desired relay closed time.

Microcomputer IC1 represents a typical microcomputer used to control the paystation coin relay. It should be noted however that the present invention is not necessarily limited to that particular microcomputer. Referring again to FIG. 3, pins 8 and 9 of IC1 are inputs from the microswitch S1 as shown in FIGS. 1 and 2 as switch 8. This switch S1 is normally open and closes once the relay is operated. Pin 11 of microcomputer IC1 is an output which supplies drive through inverter driver IC2A and resistor R1 to transistor Q1. Pin 7 of circuit IC1 is an output which supplies drive through driver IC2C and resistor R3 to transistor Q3. Transistors Q1 and Q3 when both turned on supply drive current in one direction through relay coil L1. Likewise, in a similar manner, transistor Q2 and Q4 supply the necessary drive current to the relay coil in the opposite direction. Microcomputer IC1 outputs 4 and 5 both supply drive current to transistors Q5 and Q6. When Q1 and Q5 are both turned on resistor R7 supplies a holding current through the relay coil L1. Likewise, transistors Q2, Q6 and resistor R8 supply holding current in the opposite direction.

Referring again to FIG. 3, a typical sequence of operation of the coin relay mechanism of the present invention and its associated control circuit would be as follows:

Initially pin 11 of microcomputer IC1 would be high which will turn on transistor Q1. When pin 7 will be set of microcomputer IC1 low which will turn on transistor Q3. At this time monitor pins 8 and 9 of the microcomputer will determine when the relay closes. When the switch S1 contacts close, they will then set pin 5 of the microcomputer IC1 low to turn on transistor Q5 and set pin 7 of microcomputer IC1 high to turn off transistor Q3. After the relay has been closed for the desired operate time transistor Q5 will then be turned off. Finally, monitor switch S1 will open to insure the relay properly restores to the open position.

The above sequence would be the same when used to operate the relay in the opposite direction but instead by utilizing microcomputer outputs 4, 6 and 10, respectively.

In the present invention, by providing the magnetic shield between the relay armature 3 and the relay core 2, the force required to restore the relay to the open position is substantially reduced without significantly reducing the relay's sensitivity. By reducing the force required to restore the relay to the open position, the drive current required to operate the relay is also substantially reduced. The inclusion of the magnetic shield between the relay armature and the relay core also causes the release time of the relay to be substantially reduced. This reduced release time of the relay is shorter than the time normally utilized to allow coins to clear the relay which will allow the microcomputer to extend the operating time through the use of the hold current.

The addition of a switch contact on the relay permits the microcomputer to monitor the operation of the relay to determine when the relay is fully operated. The close contact of the switch 8 can indicate to the microcomputer IC1 is necessary to switch from the operate current mode to the hold current mode thus substantially reducing the amount of operating current required. It has been determined that by means of the combination of the above features of the present relay the amount of current required to operate the coin relay of the present invention is reduced by 60% over prior art coin relays as utilized in the deregulated paystation market.

While but a single embodiment of the present invention has been shown it will be obvious to those skilled in the art that numerous modifications can be made without departing from the spirit of the present invention which shall be limited only by the scope of the claims appended hereto.

What is claimed is:

1. A relay for use in a coin operated telephone paystation operable to control an associated coin hopper mechanism to collect, or in the alternative, to refund coins deposited in said telephone paystation, said relay including a coil, a core and an armature, the improvement comprising:

a control circuit including circuit connections to said coil, operated to conduct operating current over said connections to said coil, to operate said armature to move in a direction toward said core;

and a shield of non-magnetic metallic material located between said core and said armature effective to reduce the force required to restore said relay to a non-operated mode by reducing said current required to operate said relay, said shield further operated to reduce the release time of said relay.

2. A relay as claimed in claim 1 wherein:

there is further included switching means located adjacent to said armature including circuit connections to said control circuit, operated in response to said movement of said armature to cause said control circuit to change the current to said relay coil from an operating mode to a holding mode.

3. A relay as claimed in claim 2 wherein:

said switching means comprise a microswitch connected to said circuit connections, and an actuator for said microswitch positioned adjacent to said armature.

4. A relay as claimed in claim 3 wherein:

there is further included a mounting bracket attached to said relay core, supporting said microswitch and including a return spring attached to said bracket.

5. A relay as claimed in claim 4 wherein:

there is further included an armature support bracket affixed to said armature and pivotally mounted to said relay core, said support bracket connected to said return spring.

6. A relay as claimed in claim 5 wherein:

there is further included a selector card and a rocker arm attached to said armature support bracket and engaging said selector card.

7. A relay as claimed in claim 6 wherein:

there is further included a center pole piece comprising a structure extending from said relay core to an area adjacent to said selector card;

and a bar magnet positioned on said selector card and adjacent to a portion of said center pole piece.

8. A relay as claimed in claim 7 wherein:

there is further included a support frame fastened to said relay core and further supporting said selector card;

said support frame further including a center pin projecting from said support frame.

9. A relay as claimed in claim 8 wherein:

said selector card includes a first slot adapted to engage a first operating section of said coin hopper mechanism to collect coins deposited in said telephone and a second slot adapted to engage a second portion of said coin hopper mechanism to operate said mechanism to refund coins deposited in said telephone.

* * * * *